(12) United States Patent
Nagar

(10) Patent No.: US 7,831,463 B2
(45) Date of Patent: Nov. 9, 2010

(54) COMPUTER-IMPLEMENTED METHOD AND SYSTEM FOR ALLOCATING CUSTOMER DEMAND TO SUPPLIERS

(75) Inventor: Amit Nagar, Milpitas, CA (US)

(73) Assignee: SAP AG, Walldorf (DE)

( * ) Notice: Subject to any disclaimer, the term of this patent is extended or adjusted under 35 U.S.C. 154(b) by 1418 days.

(21) Appl. No.: 10/934,468

(22) Filed: Sep. 7, 2004

(65) Prior Publication Data

US 2006/0053063 A1 Mar. 9, 2006

(51) Int. Cl.
*G06F 17/10* (2006.01)
(52) U.S. Cl. ........................................ 705/11
(58) Field of Classification Search ............... 705/11
See application file for complete search history.

(56) References Cited

U.S. PATENT DOCUMENTS

| | | | |
|---|---|---|---|
| 7,343,311 B2 * | 3/2008 | Ganesan et al. | 705/8 |
| 2002/0026429 A1 * | 2/2002 | Lostis et al. | 705/80 |
| 2002/0178049 A1 * | 11/2002 | Bye | 705/11 |
| 2005/0216280 A1 * | 9/2005 | Beddingfield et al. | 705/1 |

OTHER PUBLICATIONS

Cakravastia et al ("Two-stage Model for the design of supply chain networks," International Journal of Production Economics, 80, 2002, pp. 231-248).*

Lee et al ("Outsourcing capacity planning for an IC design house" International Journal of Advanced Manufacturing Technology (2004) 24: pp. 306-320).*

Weber et al ("Vendor selection criteria and methods," European Journal of Operational Research, 50, 1991, pp. 2-18.*

Weber, Charles Arthur ("A decision support system using multicriteria techniques for vendor selection," PhD dissertation, Ohio State University, 1991).*

Tapan Sen, Parthasarati Dileepan and Mary R. Lind. ("Minimizing a weighted quadratic function of job lateness in the single machine system," International Journal of Production Economics, # 42, 1995, pp. 237-243).*

John Mittenthal and M. Raghavachari ("Stochastic Single Machine Scheduling with Quadratic Early-Tardy Penalties," Operations Research, vol. 41, No. 4, Jul.-Aug. 1993, pp. 786-796).*

W. Townsend ("The Single Machine Problem with Quadratic Penalty Function of Completion Times: A Branch-and-Bound Solution," Management Science, vol. 24, No. 5, Jan. 1978, pp. 530-534).*

(Continued)

*Primary Examiner*—Scott L Jarrett
*Assistant Examiner*—George H Walker
(74) *Attorney, Agent, or Firm*—Finnegan, Henderson, Farabow, Garrett & Dunner, LLP

(57) ABSTRACT

Systems and methods consistent with the present invention provide a supplier performance measurement that uses historical data combined from disparate data sources to evaluate suppliers and rank the suppliers according to key performance indicators or attributes. The supplier rankings are used in a qualitative model to allocate customer demand to the suppliers based upon the supplier rankings and other factors.

15 Claims, 5 Drawing Sheets

OTHER PUBLICATIONS

L. de Boer, L.L.M van der Wegen, Practice and promise of formal supplier selection: a study of four empirical cases, Journal of Purchasing and Supply Management, vol. 9, Issue 3, May 2003, pp. 109-118, ISSN 1478-4092, DOI: 10.1016/S1478-4092(03)00018-9.*

SAP MM Vendor Evaluation Release 4.6c.*

Charles A. Weber, Anand Desai, Determination of paths to vendor market efficiency using parallel coordinates representation: A negotiation tool for buyers, European Journal of Operational Research, vol. 90, Issue 1, Apr. 5, 1996, pp. 142-155, ISSN 0377-2217, DOI: 10.1016/0377-2217(94)00336-X.*

Srinivas Talluri, Ram Narasimhan, Vendor evaluation with performance variability: A max-min approach, European Journal of Operational Research, vol. 146, Issue 3, May 1, 2003, pp. 543-552, ISSN 0377-2217, DOI: 10.1016/S0377-2217(02)00230-8.*

* cited by examiner

COMPUTER-IMPLEMENTED METHOD AND SYSTEM FOR ALLOCATING CUSTOMER DEMAND TO SUPPLIERS

FIELD OF THE INVENTION

This invention relates to providing a framework for supplier performance measurement and, more particularly, for providing ranking of suppliers based upon key performance indicators and using the rankings in allocating customer demand for products to the suppliers.

BACKGROUND OF THE INVENTION

Currently, a business (or organization) may incur different types of expenses as part of a total expense in order to provide goods and/or services to customers. In addition, the Internet economy has placed demands on the types of expenses incurred by the business. In particular, a traditional supply chain has been extended beyond the business' boundaries, additional revenue streams are more difficult to receive than previously, and profit margins have dwindled due to increased competition. Businesses are, therefore, forced to re-examine the extended supply chains and identify areas of improvement for lowering the different types of expenses.

One type of expense results from a procurement process which involves buying goods from external suppliers in response to customer demand. The procurement process may be a major component of the total expense incurred by the business, thus controlling the costs associated with the procurement process may aid in improving the profit margins.

Traditionally, software vendors and businesses have worked together to focus on optimizing internal processes within the business in order to decrease the total expense. One way that software vendors and businesses have focused on optimizing internal processes is through use of an Enterprise Resource Planning (ERP) component or software which manages their business processes.

When business revenues decrease, focus often shifts to optimizing the business' interactions with suppliers, partners, and customers of the business. In response, software vendors may enhance their application suites by including other components such as a Customer Relationship Management (CRM) component and a Supplier Relationship Management (SRM) component.

Together, the ERP, CRM, and SRM components comprise what may be called an "Extended Enterprise." The Extended Enterprise focuses on the business or its processes and also into processes of suppliers and customers. An Extended Enterprise integrates customers and suppliers to better serve the extended supply chain.

In general, the ERP, CRM, and SRM components focus on different areas of the supply chain with an objective of improving business processes. ERP software is designed to be inward-facing, that is, primarily deal with internal functioning of the business. Conversely, the CRM component is generally outward-facing. Specifically, the CRM component focuses on the customer's processes and provides tools to analyze customer data. This allows the business to better serve customer needs. It also allows the business to collect valuable market intelligence that can assist in operational as well as strategic decision-making. In addition, the SRM component is generally outward-facing by dealing with the suppliers.

Embodiments of methods and systems consistent with the present invention improve sourcing practices and provide better support for operational and strategic planning by providing a framework that enables a business to analyze the historical procurement data of particular suppliers and use the generated information in its current planning decisions through a supplier performance measurement (SPM).

SUMMARY OF THE INVENTION

In accordance with the invention, there is provided a computer-implemented method for selecting suppliers in a procurement process. The method includes identifying at least two supplier performance attributes; associating a weight with each pair of supplier performance attributes; determining an overall importance value for each of the at least two supplier performance attributes based on the weights for each pair of supplier performance attributes; determining a supplier ranking value for each supplier based on the overall importance values and supplier performance information for each supplier, the supplier performance information comprising data describing the supplier's performance in each of the at least two supplier performance attributes; and allocating customer demand to the suppliers based upon the supplier ranking values.

In addition, there is provided a computer-implemented system for evaluating suppliers in a procurement process. The system includes a supplier database having data associated with each supplier; and an analysis tool for determining attributes, a relative importance of each attribute, attribute ranking values for each attribute associated with each supplier, and a supplier ranking for each supplier based upon a relationship between the importance values and the attribute ranking values for each supplier. The analysis tool uses a qualitative model for allocating customer demand to the suppliers based upon the supplier ranking values.

BRIEF DESCRIPTION OF THE DRAWINGS

The accompanying drawings, which are incorporated in and constitute a part of this specification, show implementations consistent with the invention and together with the description, serve to explain the principles of the invention. In the drawings.

DESCRIPTION OF THE EMBODIMENTS

Reference will now be made in detail to the exemplary embodiments of the invention, which are illustrated in the accompanying drawings. Wherever possible, the same reference numbers will be used throughout the drawings to refer to the same or like parts.

Figure 1:
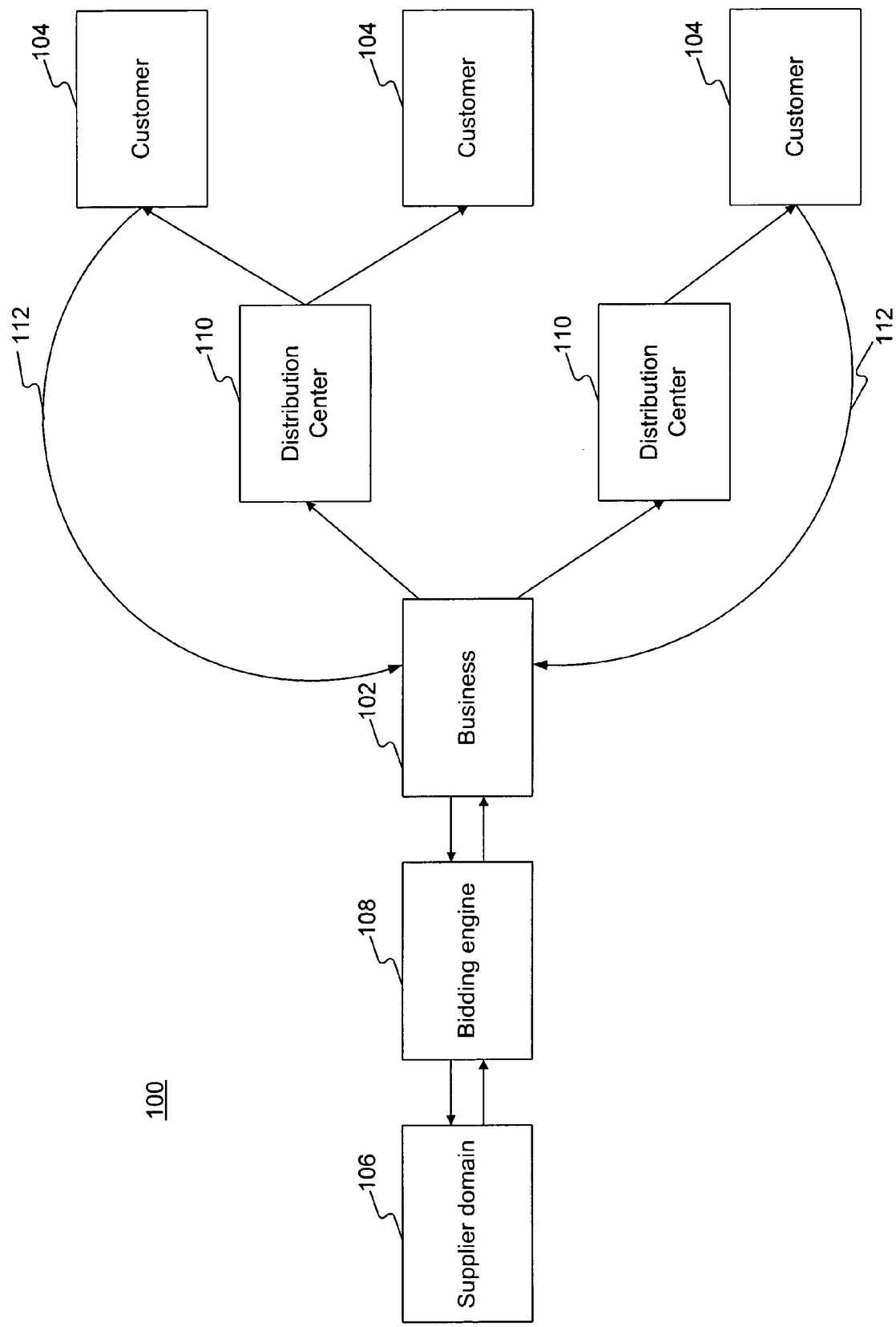
FIG. 1 illustrates one example of a supply chain system.

FIG. 1 provides a high-level view of a supply chain 100. Supply chain system 100 includes business 102, customers 104, suppliers 106, bidding engine 108, and distribution centers 110.

Generally, business 102 receives incoming orders for a product from various customers 104 (step 112). Business 102 submits an inquiry to suppliers 106, e.g., an inquiry of a price of the product. The inquiry may be handled by bidding engine 108. A bidding engine is a software application that may be integrated with the SRM component. A business that has such a bidding engine may invite buyers and sellers to participate in a bidding process similar to an online auction offered by companies such as eBay. In turn, the supplier in supplier domain 106 may send a quote to business 102, e.g., a price of the product through bidding engine 108. Business 102 orders the product and ships the product to distribution centers 110, which may deliver the products to customers 104.

Figure 2:
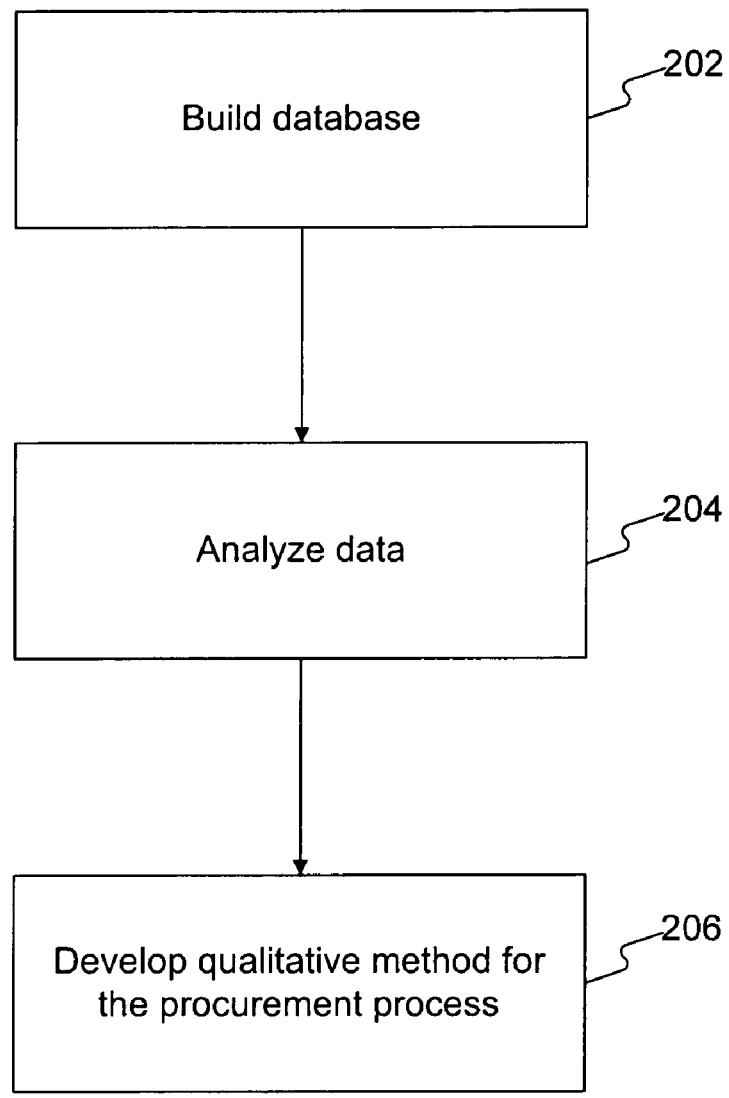
FIG. 2 is a flowchart of a method for providing a supplier performance measurement consistent with the principles of the present invention.

FIG. 2 is flowchart illustrating a method 200 for providing a supplier performance measurement (SPM) consistent with the principles of the present invention. Generally, the SPM measures and analyzes the performance of individual suppliers (e.g., suppliers 106) for the business by identifying strengths and weaknesses of the suppliers. In addition, the SPM provides data that allows the business to rank the suppliers and make planning decisions.

In method 200, a database is built (stage 202). The database may receive transactional data from disparate data sources (e.g., an Oracle Financial data source, an SAP e-procurement data source, or other applications), and combine the data to form a common database, for example, a supplier database (such as supplierDB). Combining data from disparate data sources may provide a unified view of transactional data because all the data is combined into one source. Having a common database may also provide high performance data access because multiple data sources would not need to be accessed. The transactional data may include, for example, information regarding the lead times in procuring items. Generally, the transactional data may be any information needed by the business to analyze its operations. The common database may also be known as a business warehouse.

Figure 4:
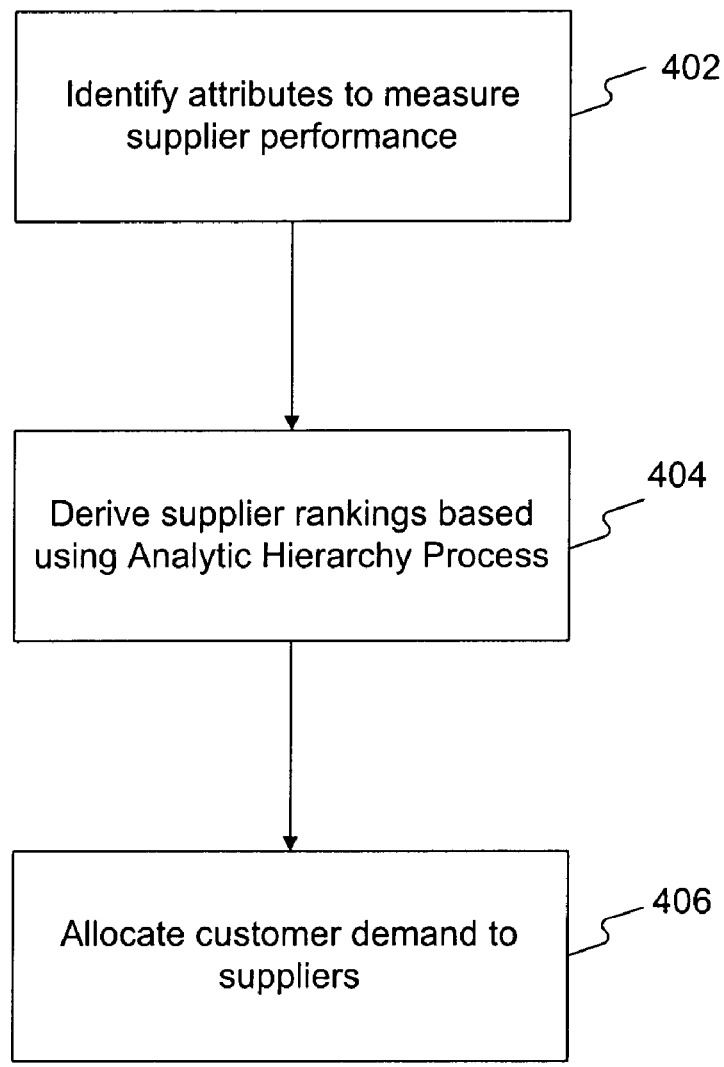
FIG. 4 is a flowchart of a method for analyzing data in a supplier database consistent with the principles of the present invention.

At stage 204, the combined data in the database is analyzed to gather data describing the business' interactions with its suppliers as described further with regard to FIG. 4. Statistical techniques may be used to forecast each supplier's ability to provide a product to the business. The business may determine rankings for its suppliers. The analysis of the database may assist in: 1) determining a supplier ranking (e.g., individual rankings and stratification of suppliers); 2) assessing supplier performance versus key attributes (e.g., procurement cost, quality, lead time, and past performance as explained in further detail with regard to FIG. 4); 3) planning future decisions; 4) performing "what-if" analysis, that is, analyzing the effect of changing a performance measure on the supplier performance; and 5) conducting business reporting.

At stage 206, a qualitative (or planning) method is developed for the procurement process as described further in FIG. 4. One objective of the procurement process is to determine how to allocate customer demand to suppliers. In methods consistent with the present invention, the allocation takes into account such information as real time customer demand, the historical information from the database (e.g., the supplierDB), and final quotations submitted by the supplier. "Real time demand" means that the customer has already generated the demand and implies that product delivery due dates are available to the planning model.

The historical information may allow or assist the business in negotiating a cost basis with the suppliers. For example, if a supplier has a poor performance that results in lost sales for the business, the business may notify the supplier in the form of feedback. The historical information may be used by the business for future negotiations with the supplier and feedback may give suppliers the opportunity improve their performance. In addition, another factor recorded as historical data may be whether the supplier delivers goods on time.

In certain embodiments, suppliers may have already submitted their final quotations and the planning model may already have cost information and be aware of the delivery timelines provided by the suppliers. Using the supplier rankings determined in stage 204, the qualitative model determines the allocation of customer demand to the suppliers as explained in further detail with regard to FIG. 4.

Figure 3:
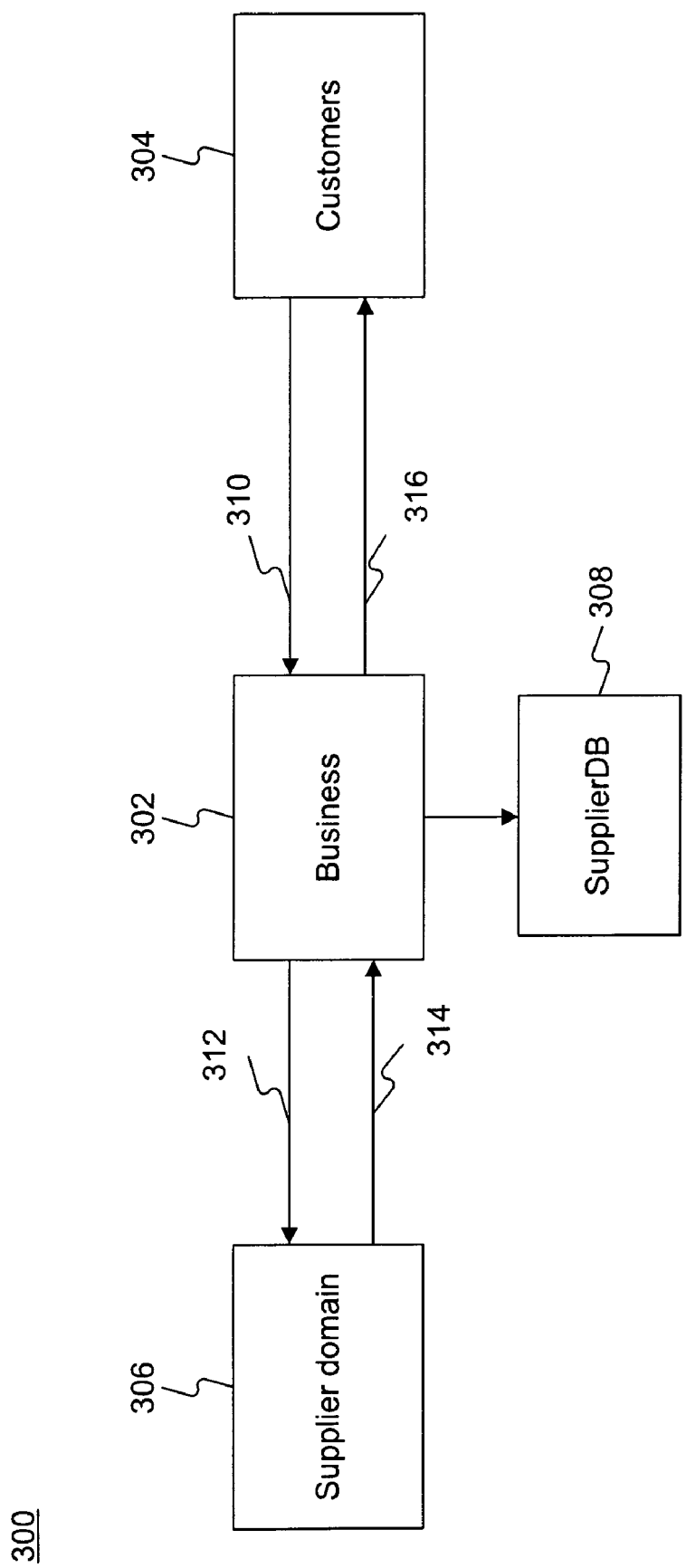
FIG. 3 illustrates a supply chain system implementing a framework for the supplier performance measurement consistent with the principles of the present invention.

FIG. 3 illustrates a supply chain 300 for an SPM consistent with the present invention. Supply chain 300 includes business 302, customers 304, supplier domain 306, and supplierDB 308.

Business 302 receives orders for goods and/or services from customers 304 (stage 310) and requests a quote from suppliers 306 for the goods and/or services (stage 312). Suppliers 306 may supply a quote to business 302 (stage 314). Business 302 may also procure goods from supplier 306 and provide the goods to customers 304 (stage 316). Customers may also provide feedback to business 302 (e.g., complaints) which may be stored in supplierDB 308.

In addition to storing information regarding the orders from customers, the requests for quotes, and the quotes supplied by suppliers 302, supplierDB 308 may also store information about each of suppliers 306, such as historical data of past dealings and relations between each of suppliers 306 and business 302. SupplierDB 308 may also store information regarding return of the goods or complaints by the customer. Business 302 may allow for 360 degree feedback with the supplier. That is, the business may provide input or suggestions (feedback) to the suppliers and vice versa.

SupplierDB 308 may be designed to allow standardization of purchasing data (e.g., vendor names IBM versus I.B.M. stored in different databases). For example, if there are multiple databases that store the purchasing data, it may be possible that the multiple databases are designed and maintained by different users. Thus, this may lead to inconsistencies in terminology (e.g., "meters" vs. "mtrs." or "mts."). By having a common database, data being entered into the common database can be changed to ensure standard usage of terms.

SupplierDB 308 may also be designed to allow transparency of the procurement process. That is, suppliers may view supplierDB 308 and thus, may be able to view the criteria from which the suppliers are being judged and the basis for the ranking decisions by the business as described below.

SupplierDB 308 may also be designed to allow feedback to the planning models. SupplierDB 308 may implicitly provide input to the business for use in making ranking decisions. The ranking decisions may determine a supplier rank which is used as part of a planning model, as explained in further detail below.

Business 302 may measure performance of one or more suppliers 306 by using Supplier Performance Measurement (SPM) Analytics. All of these factors may be done with an aim to align suppliers in domain 306 with a strategic and corporate objective of business 302.

In one implementation, SPM Analytics may be used to determine a supplier ranking. For example, the supplier ranking may be based on a supplier accountability value, such as a value assigned to a supplier that indicates level of performance. For example, each of suppliers 306 may be penalized for poor performance by being assigned a low supplier accountability value and rewarded for good performance by being assigned a high accountability value. This may be achieved by factoring the performance of one or more suppliers 306 into a total cost of procurement from a concerned supplier. For example, the assigned accountability value may be factored into an equation designed to determine the total cost of procurement from a particular supplier and based on the total cost of procurement for each of suppliers 306, suppliers 306 may be ranked relative to each other. If the accountability value is low (poor performance), the total cost of procurement for that particular supplier will increase. If the accountability value is high (good performance), the total cost of procurement for that particular supplier will decrease. In addition, based upon the supplier ranking, suppliers 306 may take corrective measures (e.g., making sure that goods are delivered as close to a due date as possible), thereby improving their accountability value.

Data contained within the database (e.g., supplierDB 308) may be analyzed in accordance with the exemplary method of FIG. 4. For example, as noted above and explained in further detail below, historical data may be used to rank the suppliers and assist businesses in negotiations with suppliers. The ranking of suppliers may determine how to allocate customer demand.

One exemplary method consistent with the present invention comprises identifying Key Performance Indicators (KPI) or attributes to measure supplier performance, deriving supplier ranking information, and inputting the supplier ranking information into a qualitative (planning) model. Specifically, the method may comprise assigning weights to each KPI based upon its relative importance in the business. Each supplier may be ranked with respect to the user-defined KPIs. In at least one embodiment consistent with the present invention, the method may derive supplier rankings based upon the KPIs and a conventional decision-making technique such as Analytic Hierarchy Process (AHP). The supplier ranking information may be inputted into a planning model, as explained further in FIG. 4. The planning model may assist in procurement decisions by providing a qualitative measure of how to allocate customer demand to the suppliers based upon each supplier's ranking information as explained in greater detail below.

FIG. 4 illustrates a flowchart for a method 400 for analyzing the data within the database consistent with the principles of the present invention. In stage 402, method 400 identifies attributes to measure supplier performance. The attributes may be procurement cost, quality, lead time, and past performance. When a business is searching for an ideal supplier based upon multiple criteria, the search may be described as a multiple criterion decision-making (MCDM) problem. Generally, MCDM problems have a set of alternatives (e.g., different suppliers that may supply goods to the business) that may be evaluated based on a given set of attributes that, in some cases, may be conflicting in nature. Therefore, finding an optimal solution for the MCDM problem may involve using AHP. AHP generally provides solving a problem in a hierarchical fashion: evaluate objectives by following a pairwise comparison technique and rank the alternatives on the attribute set.

With regard to the present invention, a procurement or sourcing expert may lead the process of determining the KPIs. Typically, the KPIs (or attributes) may be derived explicitly (such as, for example, cost), implicitly (such as, for example, quality), or as a composite of other measures (such as, for example, past performance). In certain embodiments, the KPI information may be stored in the supplierDB. Exemplary types of KPIs may include: 1) a procurement cost, which may be a total cost of procuring goods including fixed and variable components; 2) lead time, which may be the amount of time it takes for a supplier to deliver goods after receiving an order; 3) quality, which may be measured implicitly as number of returns and customer complaints; and 4) past performance. In certain embodiments, past performance may be calculated as a weighted average of a supplier's past performance. Other KPIs or attributes may be determined by the organization based upon characteristics organization desires to measure against a supplier.

At stage 404, supplier rankings are derived based on the identified attributes. The relative importance of the attributes may be ranked and may vary across businesses. Factors such as the nature of product (commodity versus critical sub component of an assembled product) and organization policies (cost containment versus quality focus) may determine the relative importance.

Generally, in AHP-based solutions, the starting point may be to specify relative weights to the attributes. With regard to the present invention, the decision maker may provide a relative importance or preference for attribute-pairs (e.g., procurement cost vs. quality) by selecting weights according to an arbitrary scale of 0-9. The weights may be normalized. For example, when comparing attributes i and j, a value of 1 may indicate that attribute i is somewhat more important than attribute j, whereas value 9 may indicate that attribute i is much more important than attribute j. An exemplary preference matrix is shown in Table 1 below.

TABLE 1

Preference Matrix

|  | Procurement cost | Quality | Lead time | Past performance |
|---|---|---|---|---|
| Procurement cost | 1 | 4 | 6 | 3 |
| Quality | 1/4 | 1 | 4 | 3 |
| Lead time | 1/6 | 1/4 | 1 | 1/4 |
| Past performance | 1/3 | 1/3 | 4 | 1 |

The exemplary matrix in Table 1 shows that the organization is cost conscious and places more importance on procurement cost than on any other attribute. Table 1 also shows that the business is quality conscious and rates that attribute higher than lead times and supplier's past performance. Once the initial responses have been elicited, the values may be normalized by dividing each cell value by the column total. For example, for the first column (Procurement Cost) the normalized value for the first row (procurement cost) is determined by calculating the following equation:

$$1/(1+\frac{1}{4}+\frac{1}{6}+\frac{1}{3})=0.572$$

Therefore, cell (1,1) in the matrix of Table 2, which represents a normalized value of cell (1,1) of the matrix of Table 1, equals 0.572. Similarly, using the values in the other cells of matrix in Table 1 may determine normalized values of Table 2 as shown below. Averages for the attributes (last column of Table 2) may be determined by adding the normalized values for each cell in each row and dividing by four (4), which represents the number of attributes for this example.

TABLE 2

Normalized Preference Matrix

|  | Procurement cost | Quality | Lead time | Past performance | Average |
|---|---|---|---|---|---|
| Procurement cost | 0.572 | 0.716 | 0.400 | 0.414 | 0.526 |
| Quality | 0.143 | 0.179 | 0.267 | 0.414 | 0.214 |

TABLE 2-continued

Normalized Preference Matrix

|  | Procurement cost | Quality | Lead time | Past performance | Average |
|---|---|---|---|---|---|
| Lead time | 0.095 | 0.045 | 0.067 | 0.035 | 0.069 |
| Past performance | 0.190 | 0.060 | 0.267 | 0.138 | 0.164 |

The averages may indicate an estimate of the relative importance of each measure with respect to the other measures. In this example, as shown in Table 2, procurement cost, having an average value of 0.526, may be the most important goal for the business followed by quality (0.214), past performance (0.164) and on time delivery (lead time) (0.069). The row averages may smooth out any inconsistencies in the decision maker's choices as specified in Table 1.

Also, individual suppliers may be evaluated on each objective. The process is similar to ranking the objectives, however, in this case the decision maker may use historical data for certain attributes such as quality or lead times to assign preferences. An exemplary preference matrix for the cost attribute is shown below in Table 3 and an exemplary normalized preference matrix for the cost attribute is shown in Table 4.

TABLE 3

Preference Matrix for Procurement Cost

| Cost Attribute | Supplier A | Supplier B | Supplier C | Supplier D |
|---|---|---|---|---|
| Supplier A | 1 | 3 | 4 | 9 |
| Supplier B | 1/3 | 1 | 5 | 1/5 |
| Supplier C | 1/4 | 1/5 | 1 | 1/4 |
| Supplier D | 1/9 | 5 | 4 | 1 |

TABLE 4

Normalized Preference Matrix for Procurement Cost

| Cost Attribute | Supplier A | Supplier B | Supplier C | Supplier D | Average |
|---|---|---|---|---|---|
| Supplier A | 0.590 | 0.326 | 0.286 | 0.861 | 0.516 |
| Supplier B | 0.197 | 0.109 | 0.357 | 0.019 | 0.171 |
| Supplier C | 0.116 | 0.022 | 0.071 | 0.019 | 0.057 |
| Supplier D | 0.012 | 0.543 | 0.286 | 0.096 | 0.234 |

In addition to the preference matrix for the cost attribute of Table 3, preference matrixes for the other attributes may also be created by the decision maker. Average values for the other attributes, which may be calculated in the same manner as described for the average values for the cost attribute, in conjunction with the average values calculated for the cost attribute as shown in Table 4 may be used to determine a ranking value for the suppliers. For example, where supplier A's averages for the other attributes are 0.25 for the quality attribute, 0.1 for the lead time attribute, and 0.15 for the past performance attribute, the rank of supplier A may be determined. The rank may be determined by multiplying supplier A's average for each attribute by the average of the attribute (as shown in Table 2) and adding those values together as follows:

Rank(supplierA)=(0.516*0.526)+(0.25*0.214)+ (0.1*0.69)+(0.15*0.164)=0.356

Thus, a ranking for supplier A may be a value equal to 0.356. Rankings for suppliers B, C, and D may be calculated in a similar manner.

As shown above, selecting a relative importance between attributes allows the decision maker to make trade-offs between various attributes. In addition, AHP may be used as a "WHAT-IF" analysis tool. For example, the decision maker can determine the affect of changing the relative importance of the performance measures on procurement decisions.

In certain embodiments, the suppliers may be provided with limited access to relevant views of supplierDB. This may be accomplished by providing the suppliers with a certain view of supplierDB to have access to information such as the lead times of that supplier.

These views may assist in determining organization priorities as well as strengths and weaknesses as perceived by the business. Such information may allow a business to improve supplier relationships and contribute to building sourcing as a strategic function.

In addition, other statistical analysis techniques known in the art may be used to analyze further the data stored in supplierDB such as regression analysis, time series analysis, and forecasting. These statistical techniques may be used because there may be past data in supplierDB 308 for a period of time. for example, in a regression analysis the equation y=ax+b may be used. In this equation, y is a dependent variable which depends upon independent variable x. Given the existence of past values for x and y, estimates for a and b may be calculated which may be represented as a(1) and b(1). An equation to represent this may be y=a(1)x+b(1). Given this equation, y may be predicted for a given value of x. For purposes of analyzing data in supplierDB 308, since there is past data for the performance of suppliers, the business may use regression analysis to make determinations based upon the past data in supplierDB 308. Thus, the dependence of a dependent variable (supplier ranking) on independent variables (cost, quality etc) may be analyzed.

At stage 406, ranking information is received by the planning model or qualitative model and may be used to allocate customer demand among the suppliers. For example, a business may have a requirement for p items that have been ordered by m customers, and there may be n suppliers who can potentially fulfill these orders. In allocating the customer demand among the suppliers based on certain objectives and constraint, a realistic objective for the business is to procure the items at a minimum cost while minimizing the risk. The cost component may be quantifiable figure. The risk may also be quantified by using criteria such as on time product delivery, meeting all the requested demand, quality, and supplier reliability.

An exemplary qualitative model consistent with the present invention may factor in these criteria by using related criteria that may be measured, as shown below:

| | |
|---|---|
| Quantity ordered by $j_{th}$ customer for $k_{th}$ item | $q_{jk}$ |
| Quantity allocated to $i_{th}$ supplier for $k_{th}$ item | $x_{ik}$ |
| Due date specified by $j_{th}$ customer for $k_{th}$ item | $d_{jk}$ |
| Unit cost of item k for supplier l | $c_{ik}$ |

Given the above notation, the objective function for the planning problem can be written as:

$$\frac{1}{\alpha_{ii}}\left[\sum_{k=1}^{p}\left(c_{ik}x_{ik} + \beta\sum_{j=1}^{m}(djk - dj)^2\right)\right]$$

where, $$\sum_{k=1}^{p} c_{ik}x_{ik}$$

is a cost as quoted by supplier i for fulfilling the demand for the p items, and $$\beta\sum_{j=1}^{m}(d_{jk} - d_j)^2$$

is a penalty for not delivering the items on the specified due date.

In certain embodiments, an early arrival may result in inventory costs and late arrivals may result in lost sales. In these embodiments, just-in-time (JIT) principles may be utilized. Further, a quadratic penalty function (as opposed to a linear function) may be used to encourage minimal deviations from a specified due date.

In certain embodiments, the objective function may factor in the supplier's past performance into the current decision-making process. To achieve this, the objective function may use the supplier ranking information derived at stage 504. For example, the factor $1/\alpha_{ii}$ penalizes poor performance (lower rank) and rewards good performance (higher rank). This may provide an incentive to the supplier to improve their performance and/or maintain high standards.

In this exemplary model, the main constraint may be related to the quantity. In other words, the supplier i cannot supply more than the total demand for item k, i.e., $$x_{ik} \leq \sum_{j=1}^{m} q_{ik}.$$

Another constraint may require that the weights be normalized. A rational decision maker may satisfy this requirement by computing the weights using the AHP technique. Also, based on business priorities the suppliers may be heavily penalized ($\beta>1$) or not penalized at all ($\beta=0$) for deliveries that deviate from a specified due date.

The quantitative model for supplier i may be formulated as, $$\min\frac{1}{\alpha_{ii}}\left[\sum_{k=1}^{p}\left(c_{ik}x_{ik} + \beta\sum_{j=1}^{m}(djk - dj)^2\right)\right] \text{ such that:} \quad (1)$$

$$0 \leq x_{ik} \leq \sum_{j=1}^{m} q_{ik}$$

$$0 \leq \alpha i \leq 1 \quad (2)$$

$$\sum_{i=1}^{n} \alpha i = 1 \quad (3)$$

$$\beta \geq 0 \quad (4)$$

The total procurement cost to meet the overall demand may be represented as:

$$\min\sum_{i=1}^{n} TC_i \text{ such that, } \sum_{k}\sum_{i} x_{ik} = \sum_{j=1}^{m} q_{ik}.$$

The above is a simple Linear Programming (LP) problem of the type shown below. Any existing LP package may be used to solve the problem and determine and the optimal solution. Here, the optimal solution is an optimal procurement plan that allocates generated demand (d) to various suppliers (x) or Min. Ax+b such that, Cx=d.

Figure 5:
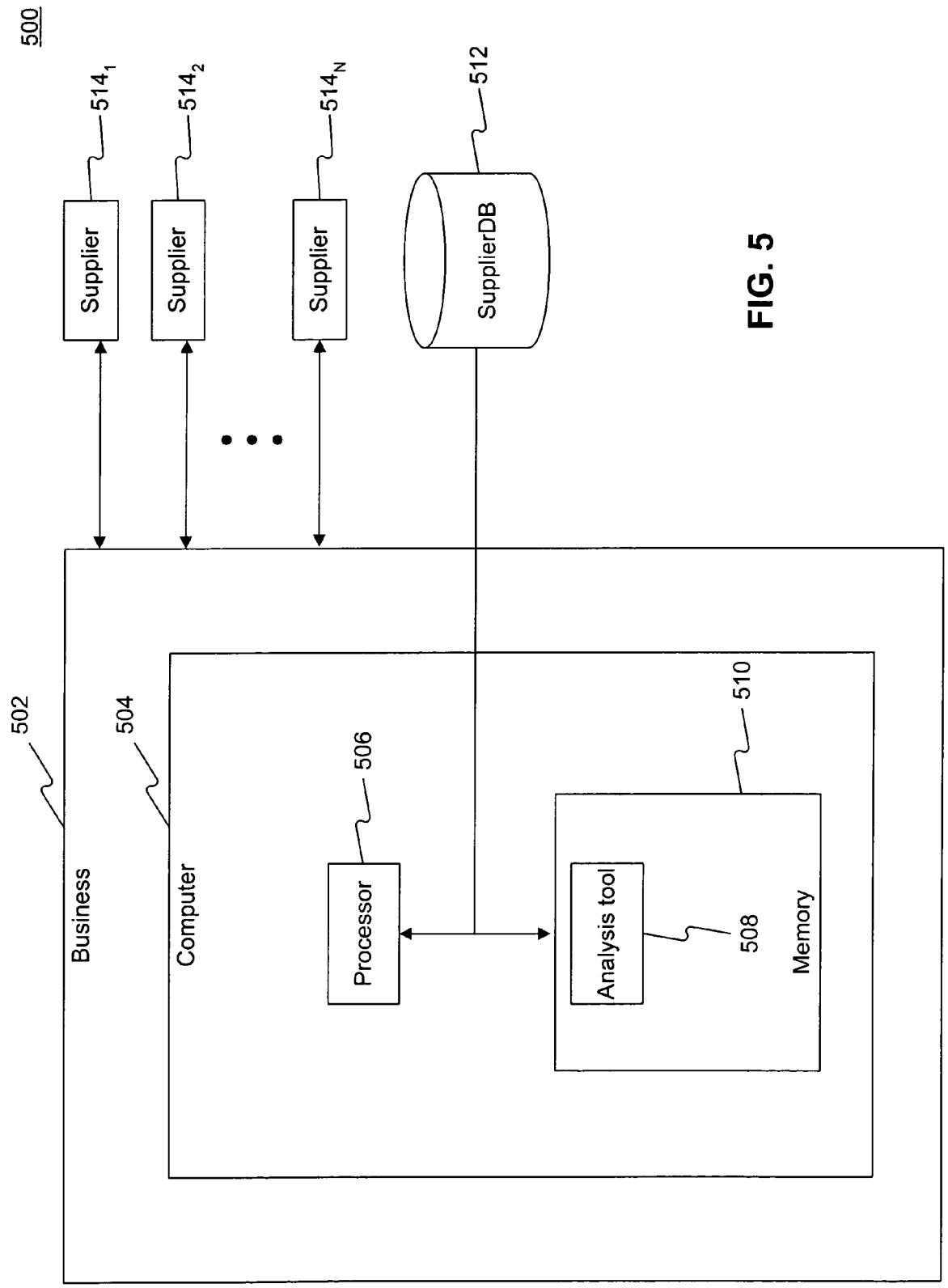
FIG. 5 is block diagram of an environment where features and aspects consistent with the present invention may be implemented.

FIG. 5 is a block diagram of an environment in which features and aspects of the present invention may be implemented. System 500 includes business 502, supplierDB 512, and suppliers 514₁ through 514ₙ. Business 502 includes computer 504 comprising processor 506 and memory 510. Computer 504 may be any computer, including a personal computer, a workstation, or mainframe computer for performing various functions and/or operations consistent with the present invention. Computer 504 may be one of several computers that are part of business 502. Computer 504 may be part of a network of computers operated by business 502. The network computers may be connected to each other, a server, and supplierDB 512 using known network connection techniques, such as a wide area network (WAN), a local area network (LAN), a token ring network, and an Ethernet. Memory 510 stores data and instructions for use by processor 506 and may further include analysis tool 508. Processor 506 executes instructions from one or more memories and storage devices and also transmits and receives information to and from other components.

Business 502 receives and sends information to suppliers 514₁ through 514ₙ as explained above. Specifically, as noted above, business 502 may send inquires to suppliers 514₁ through 514ₙ regarding products requested by customers and suppliers 514₁ through 514ₙ may send quotes to business 502. Business 502 and suppliers 514₁ through 514ₙ may communicate through the use of computers (e.g., computer 504 and computers operated by suppliers 514₁ through 514ₙ). In addition, information regarding each of suppliers 514₁ through 514ₙ may be stored in memory 510 or supplierDB 512. The information regarding each of suppliers, including historical data relating to the supplier's performance, may be transferred to supplierDB 512 by computer 504.

Computer 504 may also use information stored in supplierDB to run analysis tool 508 (e.g., by using processor 606 to run a program in memory 510) to rank suppliers 514₁ through 514ₙ. Analysis tool 508 may use the qualitative model described above to rank suppliers 514₁ through 514ₙ. Analysis tool 508 may also be stored in a secondary storage location, which may be implemented using a disk drive, CD-ROM drive, or other suitable devices.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims. Moreover, unless indicated to the contrary, in the preceding description, none of the components described in the implementations is essential to the invention.

What is claimed is:

1. A computer-implemented method for allocating customer demand to suppliers in a procurement process, the method comprising:

identifying at least two supplier performance attributes;

associating a weight with each pair of supplier performance attributes;

determining an overall importance value for each of the at least two supplier performance attributes based on the weights for each pair of supplier performance attributes;

determining, using a computer, a supplier ranking value for each supplier based on overall importance values of the at least two supplier performance attributes and supplier performance information for each supplier, the supplier performance information comprising data describing the supplier's performance in each of the at least two supplier performance attributes; and allocating, using the computer, customer demand to the suppliers by utilizing a quantitative model based upon the supplier ranking values and their performance data, wherein the quantitative model is determined by the function $$\frac{1}{\alpha ii}\left[\sum_{k=1}^{p}\left(c_{ik}x_{ik}+\beta\sum_{j=1}^{m}(d_{jk}-d_{j})^{2}\right)\right],$$

and wherein $1/\alpha ii$ is the supplier rank for a $i_{th}$ supplier; $c_{ik}$ is a unit cost of item k for supplier i; $x_{ik}$ is a quantity allocated to $i_{th}$ supplier for the $k_{th}$ item;

$$\sum_{k=1}^{p}C_{ik}\chi_{ik}$$

is a cost as quoted by supplier i for fulfilling demand for p items; $d_{jk}$ is a due date specified by the $i_{th}$ customer for $k_{th}$ item; and $$\beta\sum_{j=1}^{m}(d_{jk}-d_{j})^{2}$$

is a penalty for not delivering m items on specified due date.

2. The method of claim 1, wherein the supplier performance information is based upon historical data.

3. The method of claim 1, wherein the at least two supplier performance attributes comprise two or more of procurement cost, quality, lead time, and past performance.

4. The method of claim 1, wherein determining an overall importance value includes normalizing the overall importance value.

5. The method of claim 4, wherein determining a supplier ranking includes normalizing the supplier ranking value.

6. The method of claim 5, wherein the supplier ranking is determined by the function: $R_{supplier}=(A_1*B_1+A_2*B_2+\ldots+A_i*B_i)$; wherein $R_{supplier}$ is the supplier rank, $A_i$ is an $i_{th}$ normalized attribute ranking value for each attribute associated with each supplier, and $B_i$ is an $i_{th}$ overall importance value.

7. A computer-implemented system for allocating customer demand to suppliers in a procurement process, the system comprising:

a supplier database having data associated with each supplier; and a computer having an analysis tool identifying at least two supplier performance attributes, associating a weight with each pair of supplier performance attributes, determining an overall importance value for each of the at least two supplier performance attributes based on the weights for each pair of supplier performance attributes, and a supplier ranking for each supplier based upon overall importance values of the at least two supplier performance attributes and supplier performance information for each supplier, the supplier performance information comprising data describing the supplier's performance in each of the at least two supplier performance attributes; and wherein the analysis tool uses a quantitative model to allocate customer demand to the suppliers based upon the supplier ranking values and their performance data, wherein the quantitative model is determined by the function $$\frac{1}{\alpha ii}\left[\sum_{k=1}^{p}\left(c_{ik}x_{ik}+\beta\sum_{j=1}^{m}(d_{jk}-d_{j})^{2}\right)\right],$$

and wherein $1/\alpha ii$ is the supplier rank for a $i_{th}$ supplier; $c_{ik}$ is a unit cost of item k for supplier i; $x_{ik}$ is a quantity allocated to $i_{th}$ supplier for the $k_{th}$ item;

$$\sum_{k=1}^{p}C_{ik}\chi_{ik}$$

is a cost as quoted by supplier i for fulfilling demand for p items; $d_{jk}$ is a due date specified by the $i_{th}$ customer for $k_{th}$ item; and $$\beta\sum_{j=1}^{m}(d_{jk}-d_{j})^{2}$$

is a penalty for not delivering m items on specified due date.

8. The system of claim 7, wherein the supplier database contains historical data of the suppliers.

9. The system of claim 7, wherein the attributes include procurement cost, quality, lead time, and past performance.

10. The system of claim 7, wherein the importance values include numbers between 0-9.

11. The system of claim 10, wherein the importance values for each attribute are normalized.

12. The system of claim 11, wherein the attribute ranking values are normalized.

13. The system of claim 12, wherein the supplier ranking is determined by the function: : $R_{supplier}=(A_1*B_1+A_2*B_2+\ldots*B_i)$; wherein $R_{supplier}$ is the supplier rank, $A_i$ is an $i_{th}$ normalized attribute ranking value for each attribute associated with each supplier, and $B_i$ is an $i_{th}$ overall importance value.

14. A computer-implemented system for allocating customer demand to suppliers in a procurement process, the system comprising:

means for having data associated with each supplier; and means for identifying at least two supplier performance attributes, associating a weight with each pair of supplier performance attributes, determining an overall importance value for each of the at least two supplier performance attributes based on the weights for each pair of supplier performance attributes, and a supplier ranking for each supplier based upon overall importance values of the at least two supplier performance attributes and supplier performance information for each supplier, the supplier performance information comprising data describing the supplier's performance in each of the at least two supplier performance attributes; and;

wherein the means for determining uses a quantitative model for allocating customer demand to the suppliers based upon the supplier ranking values and their performance data, wherein the quantitative model is determined by the function $$\frac{1}{\alpha ii}\left[\sum_{k=1}^{p}\left(C_{ik}\chi_{ik} + \beta\sum_{j=1}^{m}(d_{jk} - d_j)^2\right)\right],$$

and wherein $1/\alpha ii$ is the supplier rank for a $i_{th}$ supplier; $c_{ik}$ is a unit cost of item k for supplier i; $x_{ik}$ is a quantity allocated to $i_{th}$ supplier for the $k_{th}$ item;

$$\sum_{k=1}^{p} C_{ik}\chi_{ik}$$

is a cost as quoted by supplier i for fulfilling demand for p items; $d_{jk}$ is a due date specified by the $i_{th}$ customer for $k_{th}$ item; and $$\beta\sum_{j=1}^{m}(d_{jk} - d_j)^2$$

is a penalty for not delivering m items on specified due date.

15. A non-transitory computer readable medium containing instructions for controlling a computer system to perform a method for allocating customer demand to suppliers in a procurement process, the computer system having a processor for executing the instructions, the method comprising:

identifying at least two supplier performance attributes;

associating a weight with each pair of supplier performance attributes;

determining an overall importance value for each of the at least two supplier performance attributes based on the weights for each pair of supplier performance attributes;

determining a supplier ranking value for each supplier based on the overall importance values and supplier performance information for each supplier, the supplier performance information comprising data describing the supplier's performance in each of the at least two supplier performance attributes; and allocating customer demand to the suppliers based upon the supplier ranking values and their performance data, wherein the quantitative model is determined by the function $$\frac{1}{\alpha ii}\left[\sum_{k=1}^{p}\left(C_{ik}\chi_{ik} + \beta\sum_{j=1}^{m}(d_{jk} - d_j)^2\right)\right],$$

and wherein $1/\alpha ii$ is the supplier rank for a $i_{th}$ supplier; $c_{ik}$ is a unit cost of item k for supplier i; $x_{ik}$ is a quantity allocated to $i_{th}$ supplier for the $k_{th}$ item;

$$\sum_{k=1}^{p} C_{ik}\chi_{ik}$$

is a cost as quoted by supplier i for fulfilling demand for p items; $d_{jk}$ is a due date specified by the $i_{th}$ customer for $k_{th}$ item; and $$\beta\sum_{j=1}^{m}(d_{jk} - d_j)^2$$

is a penalty for not delivering m items on specified due date.

* * * * *